(12) United States Patent
Riggs

(10) Patent No.: US 6,513,483 B2
(45) Date of Patent: Feb. 4, 2003

(54) PRE-COMBUSTION CHAMBER FOR AN INTERNAL COMBUSTION ENGINE

(75) Inventor: Thomas C. Riggs, Tomball, TX (US)

(73) Assignee: Cooper Cameron Corporation, Houston, TX (US)

(*) Notice: Subject to any disclaimer, the term of this patent is extended or adjusted under 35 U.S.C. 154(b) by 0 days.

(21) Appl. No.: 09/778,402

(22) Filed: Feb. 7, 2001

(65) Prior Publication Data

US 2002/0104507 A1 Aug. 8, 2002

(51) Int. Cl.[7] ................................................ F02B 19/12
(52) U.S. Cl. ........................................ 123/254; 123/267
(58) Field of Search ............................ 123/169 C, 254, 123/255, 266, 267

(56) References Cited

U.S. PATENT DOCUMENTS

| 1,539,133 A | * | 5/1925 | Markle et al. ....... 123/169 C X |
| 4,074,664 A | * | 2/1978 | Rollins ................ 123/41.31 X |
| 5,431,140 A | | 7/1995 | Faulkner ...................... 123/254 |
| 5,662,082 A | | 9/1997 | Black et al. ................ 123/254 |

* cited by examiner

Primary Examiner—Tony M. Argenbright
(74) Attorney, Agent, or Firm—Michael B. Hartmann; Peter A. Bielinski

(57) ABSTRACT

A pre-combustion chamber assembly for an internal combustion engine is disclosed having an inner housing having a receiver for receiving a spark plug and an inlet for fuel. A connector is provided for securing the pre-combustion chamber in a spark plug well of the internal combustion engine. An outer housing has a first end and a second end and extends around the inner housing, with a chamber being defined between the inner and outer housings. The outer housing is releasably retained around the inner housing so as to allow relative movement between portions of the inner and outer housings while maintaining the integrity of the chamber. A method of modifying an internal combustion engine and an internal combustion engine incorporating the pre-combustion chamber are also provided.

22 Claims, 3 Drawing Sheets

PRE-COMBUSTION CHAMBER FOR AN INTERNAL COMBUSTION ENGINE

TECHNICAL FIELD OF THE INVENTION

The present invention relates to a pre-combustion chamber for use with an internal combustion engine. In particular, the present invention relates to a pre-combustion chamber assembly for use in conjunction with a conventional spark plug in the cylinder head of an internal combustion engine.

BACKGROUND OF THE INVENTION

Pre-combustion chambers are known in the art and have been applied to provide an ignition system for internal combustion engines. Pre-combustion chambers have found particular application in internal combustion engines operating on gaseous fuels, such as natural gas. The engine is commonly supplied with a lean fuel mixture, that is a mixture of air and fuel containing a relatively high ratio of air to fuel. The lean fuel mixture often results in misfires, detonation, incomplete combustion and poor fuel economy. These characteristics have been traced to the poor ability of conventional spark plugs to effectively ignite a lean fuel mixture in the cylinder of the operating engine. More effective conbustion of lean fuel mixtures can be achieved using a precombustion chamber.

In the past, the incorporation of a pre-combustion chamber into an existing internal combustion engine has required substantial modification to the cylinder head of the engine. It will be readily understood that such a modification requires a significant time to effect, during which the engine will typically be inoperative. In addition, such a modification requires extensive machining and fabrication facilities, in turn preventing the modification from being one capable of being carried out in the field at the site or location of the engine.

In view of these problems, it has been proposed to provide a pre-combustion chamber assembly for converting existing, conventionally ignited engines. Thus, U.S. Pat. No. 5,431,140 discloses a pre-combustion chamber system for installation on an internal combustion engine using the existing spark plug hole in the cylinder head. The pre-combustion chamber system comprises a pre-combustion chamber, around which extends a jacket for containing a supply of coolant, such as cooling water. The pre-combustion chamber system comprises an inlet and an outlet for the coolant. The pre-combustion chamber is further provided with a threaded hole, into which a spark plug may be inserted and secured and an inlet for fuel. In use, the pre-combustion chamber is inserted into a spark plug well of the engine and threaded into the pre-existing threaded hole for the spark plug in the cylinder head of the engine. A port extends from the pre-combustion chamber and communicates with the main combustion chamber of the respective cylinder of the engine. In operation, fuel is fed to the pre-combustion chamber and is ignited at the appropriate time in the cycle of the engine by the spark plug. A stream of combusting gas flows from the pre-combustion chamber, through the port and into the main combustion chamber of the cylinder, where the main charge of fuel and air is ignited, providing the power stroke of the engine.

While the device of U.S. Pat. No. 5,431,140 proved effective in use, problems arose, leading to an undesirably short operating life span of the device. In particular, it was found that the assembly suffered from stress cracking and accelerated fatiguing. It was found that this was due to differential expansion occurring between the walls of the pre-combustion chamber and the outer wall of the coolant jacket. In use, the inner wall of the pre-combustion chamber is exposed to considerable heat, in turn causing the wall to expand. In contrast, the outer wall of the coolant jacket remains at the temperature of the coolant, which is substantially lower than that of the pre-combustion chamber wall. This difference in temperature leads to a difference in the rate and amount of thermal expansion undergone by the two aforementioned walls, in turn leading to stress cracking and failure of the device.

To overcome this problem, U.S. Pat. No. 5,662,082 proposed a modified pre-combustion chamber system. In the modified system, an inner wall defines the pre-combustion chamber and an outer wall extending around the inner wall provides for a coolant jacket, as in the earlier device. However, in the device of U.S. Pat. No. 5,662,082, the outer wall is secured at one end to the inner wall, while the second end is free to float with respect to the inner wall. In this way, movement of the inner wall with respect to the outer wall, for example due to differential thermal expansion, may be accommodated without inducing stress cracking in either component. A seal is placed between the inner and outer wall in order to close the cooling jacket and prevent escape of the coolant liquid. In a preferred embodiment, redundant seals are employed in order to ensure that coolant leakage is prevented.

In use, it has been found that the device of the general design of U.S. Pat. No. 5,662,082 is effective in extending the working life of the pre-combustion chamber device. However, it has also been found that, although increased, the working life of the device remains undesirably short. In particular, it has been observed that the devices fail as a result of excessive heat build up within the device.

Accordingly, there is a need for an improved pre-combustion chamber device, which may be fitted in the spark plug well of an existing engine, and which has a prolonged operating lifetime.

SUMMARY OF THE INVENTION

According the present invention there is provided a pre-combustion chamber assembly for an internal combustion engine, the pre-combustion chamber assembly comprising:

an inner housing defining a pre-combustion chamber, the housing having a receiver for receiving a spark plug and an inlet for fuel;

a connector for securing the pre-combustion chamber in a spark plug well of the internal combustion engine, the connector comprising a port for connecting the pre-combustion chamber with a combustion chamber of the internal combustion engine;

an outer housing having a first end and a second end and extending around the inner housing; and a chamber defined between the inner and outer housings; wherein the outer housing being releasably retained around the inner housing so as to allow relative movement between portions of the inner and outer housings while maintaining the integrity of the chamber.

It has been found that the operational life of the pre-combustion chamber assembly can be significantly improved by having the outer housing releasably retained around the inner housing, so as to allow relative movement between the inner and outer housings. In this way, relative movement between the two housings, as a result of expansion of the inner housing relative to the outer housing, can be accommodated. However, an investigation into the pre-combustion chambers has shown that simply providing for relative movement between the two housings is insufficient to effectively prolong the operational life of the assembly. It has been found that a build up of deposits and scale occurs within the chamber, reducing the heat transfer capabilities of the assembly. This has been found to occur as a result of cooling water remaining in the chamber after the engine has been shut down being caused to boil and evaporate as a result of heat remaining in the pre-combustion chamber assembly. This evaporation causes a rapid build up of scale to occur within the chamber. The heat transfer of the scale is such that it reduces the ability of the cooling medium in the chamber to remove heat from the pre-combustion chamber. This in turn has been found to lead to the pre-combustion chamber operating at ever increasing temperatures, leading to the eventual failure of the pre-combustion chamber assembly.

By having the outer housing releasable, it is now possible to clean both the outer wall of the inner housing and the outer housing as part of a maintenance program, thereby restoring the cooling capabilities of the chamber and the cooling medium within it. This has not proven possible with the pre-combustion chamber assemblies of the prior art, without embarking upon a major disassembly of the assembly, including cutting portions of the housing away. Replacement of the housing involves welding and stress relieving, before the assembly can be returned to operation. As will be appreciated, such a maintenance schedule is very costly and time consuming. This has led to the practice of simply discarding the used assemblies and replacing them with new ones.

The outer housing is preferably free to move both axially and circumferentially with respect to the inner housing.

In a first embodiment, the outer housing is fixed to the inner housing at its first end. The inner housing is free to move with respect to the outer housing at the second end of the outer housing. The outer housing may be secured to the inner housing at its first end by any suitable means known in the art, for example a simple threaded connection. In a preferred embodiment, the outer housing is retained around the inner housing in such a way that the inner housing is free to move with respect to the outer housing at both the first and second ends of the outer housing.

The outer housing may be retained around the inner housing by a retainer acting against the first end of the outer housing. The retainer is preferably a retaining ring seated in a groove in the inner housing at the first end of the outer housing. In operation, a cooling medium, such as water, is introduced into the chamber between the inner and outer housings. Metal to metal contact between the inner housing and the outer housing may suffice to retain the cooling medium within the chamber. Preferably, however, a seal is provided between the first end of the outer housing and the inner housing.

A further retainer may be provided to retain the outer housing at its second end. The further retainer may be any suitable retaining means, such as a retaining ring seated in a circumferential groove in the inner housing at the second end of the outer housing. However, it is convenient to form the inner housing with a shoulder, against which the second end of the outer housing can be brought to bear when the outer housing is first installed around the inner housing. In use, expansion of the inner housing will cause the shoulder to move away from the second end of the outer housing. Contact between the outer housing and the inner housing at the second end of the outer housing may be sufficient to retain the cooling medium with the chamber. Preferably, a seal is provided between the second end of the outer housing and the inner housing.

The connector for securing the pre-combustion chamber assembly in the spark plug well of the internal combustion engine has a first end adjacent the pre-combustion chamber and a second end, which, when the assembly is installed, extends into the bore in the cylinder head for the spark plug. In preferred embodiment, the port through the connector is arranged to generate a turbulent or swirling flow pattern for the hot gases leaving the pre-combustion chamber and entering the combustion chamber of the engine during operation. To achieve this, the port has a first opening in the first end of the connector within the pre-combustion chamber and a second opening in the second end of the connector. The first opening is offset from the central longitudinal axis of the pre-combustion chamber. Preferably, the second opening is offset from both the first opening and the central longitudinal axis of the pre-combustion chamber. In a preferred arrangement, the offset of the second opening from the central longitudinal axis of the pre-combustion chamber is greater than that of the first opening.

In a further aspect, the present invention provides an internal combustion engine comprising at least one cylinder having a combustion chamber, the engine further comprising at least one cylinder head assembly, the cylinder head assembly comprising a spark plug well and a threaded bore extending into the combustion chamber, the engine further comprising a pre-combustion chamber assembly in the spark plug well, the pre-combustion chamber assembly comprising:

an inner housing defining a pre-combustion chamber, the housing having a receiver for receiving a spark plug and an inlet for fuel;

a connector threaded into the threaded bore for securing the pre-combustion chamber in the spark plug well, the connector comprising a port for connecting the pre-combustion chamber with the combustion chamber;

an outer housing having a first end and a second end and extending around the inner housing; and a chamber defined between the inner and outer housings; wherein the outer housing being releasably retained around the inner housing so as to allow relative movement between portions of the inner and outer housings while maintaining the integrity of the chamber.

The features of the pre-combustion chamber assembly of the internal combustion engine are as hereinbefore described.

In still a further aspect of the present invention, there is provided a method of modifying an internal combustion engine, the method comprising securing in a spark plug well of the engine a pre-combustion chamber assembly, the pre-combustion chamber assembly comprising:

an inner housing defining a pre-combustion chamber, the housing having a receiver for receiving a spark plug and an inlet for fuel;

a connector for securing the pre-combustion chamber in the spark plug well of the internal combustion engine, the connector comprising a port for connecting the pre-combustion chamber with a combustion chamber of the internal combustion engine;

an outer housing having a first end and a second end and extending around the inner housing; and a chamber defined between the inner and outer housings; wherein the outer housing being releasably retained around the inner housing so as to allow relative movement between portions of the inner and outer housings while maintaining the integrity of the chamber.

Specific embodiments of the apparatus and method of the present invention will now be described in detail having reference to the accompanying drawings. The detailed description of these embodiments and the referenced drawings are by way of example only and are not intended to limit the scope of the present invention.

BRIEF DESCRIPTION OF THE DRAWINGS

Preferred embodiments of the present invention will now be described, by way of example only, having reference to the accompanying drawings, in which.

DETAILED DESCRIPTION OF THE PREFERRED EMBODIMENTS

Figure 1:
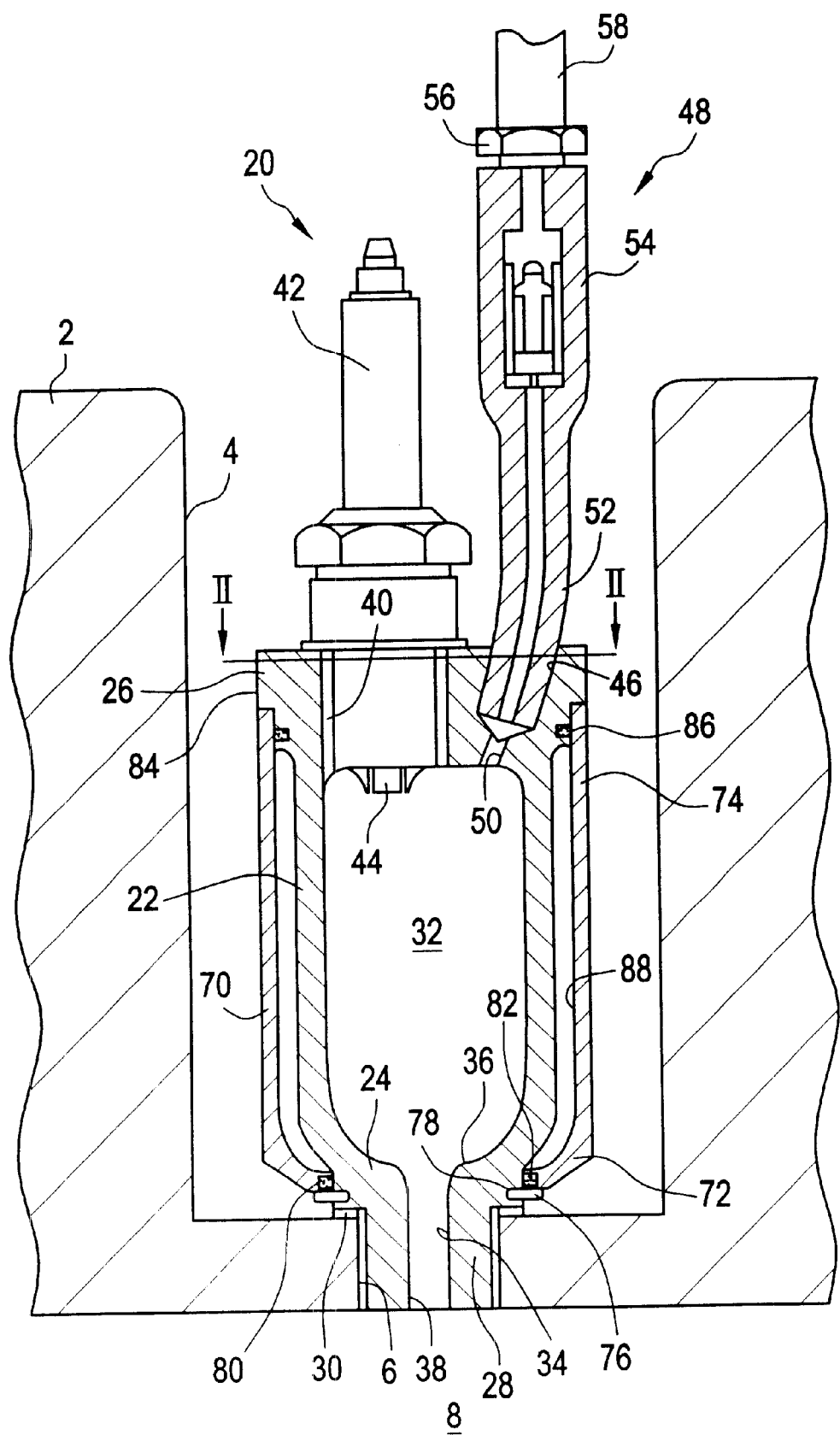
FIG. 1 is a longitudinal cross-sectional view of a pre-combustion chamber according to one embodiment of the present invention located in place in the spark plug well of an internal combustion engine.

Referring to FIG. 1, a portion of the cylinder head 2 of an internal combustion engine is shown. The portion of the cylinder head 2 comprises a spark plug well 4 formed as a blind bore in the cylinder head 2. A threaded hole 6 extends through the cylinder head 2 and communicates with a combustion chamber 8 in one cylinder of the internal combustion engine. A pre-combustion chamber assembly, generally indicated as 20, is shown in FIG. 1 located in the spark plug well 4.

The pre-combustion chamber assembly 20 comprises a generally cylindrical inner housing 22, having a first end portion 24 and a second end portion 26. A connector 28 extends from the first end portion 24 of the inner housing 22. The connector 28 has a thread formed on its outer surface, for securing in the threaded hole 6 in the spark plug well 4, as shown in FIG. 1. Washer 30 is disposed around the connector 28 and effects a seal between the end surface of the first end portion 24 of the inner housing 22 and the cylinder head 2.

The inner housing 22 defines a pre-combustion chamber 32. A port 34 extends through the connector 28, having a first opening 36 in the pre-combustion chamber 32 and a second opening 38 into the combustion chamber 8 of the engine, with the pre-combustion chamber assembly 20 in place in the engine as shown in FIG. 1.

The second end portion 26 of the inner housing 22 comprises a threaded bore 40 for receiving a conventional spark plug 42. FIG. 1 shows a spark plug 42 in place in the threaded bore 40 in the inner housing 22, with the electrode 44 of the spark plug 42 extending into the pre-combustion chamber 32. In operation, the spark plug is connected by a high tension lead (not shown) to a conventional ignition system for the internal combustion engine. The second end portion 26 of the inner housing 22 further comprises a fuel inlet bore 46, to which is connected a fuel feed assembly 48. A fuel inlet port 50 extends from the fuel inlet bore 46 and opens into the pre-combustion chamber 32.

The fuel feed assembly 48 comprises a fuel feed pipe 52 threaded at one end into the fuel inlet bore 46 in the second end portion 26 of the inner housing 22. The fuel feed assembly further comprises a check valve assembly 54, of conventional design, held in place by a check valve retainer 56. In operation, fuel is fed to the pre-combustion chamber 32 from a fuel system (not shown) through a fuel line 58 and via the fuel feed assembly 48. The flow of fuel to the pre-combustion chamber 32 is regulated by means of the check valve assembly 54 and the fuel pressure.

A generally cylindrical outer housing 70 is releasably retained around the inner housing 22 of the pre-combustion chamber assembly 20. The outer housing has a first end portion 72 and a second end portion 74. The outer housing 70 is retained in position at its first end 72 by a retaining ring 76 seated in a circumferential groove 78 in the first end portion 24 of the inner housing 22. A seal 80 is located in a seal groove 82 in the first end portion 72 of the outer housing 70 and seals the outer housing 70 to the inner housing 22 at their first ends.

The outer housing 70 is further retained at its second end 74. The second end portion 26 of the inner housing is formed with a circumferential shoulder 84, against which the second end 74 of the outer housing 70 seats, when the outer housing is in place around the inner housing 22. A seal 86 is provided in a groove in the second end portion 26 of the inner housing 22, to provide a seal between the outer housing 70 and the inner housing 22 at their second ends.

Figure 2:
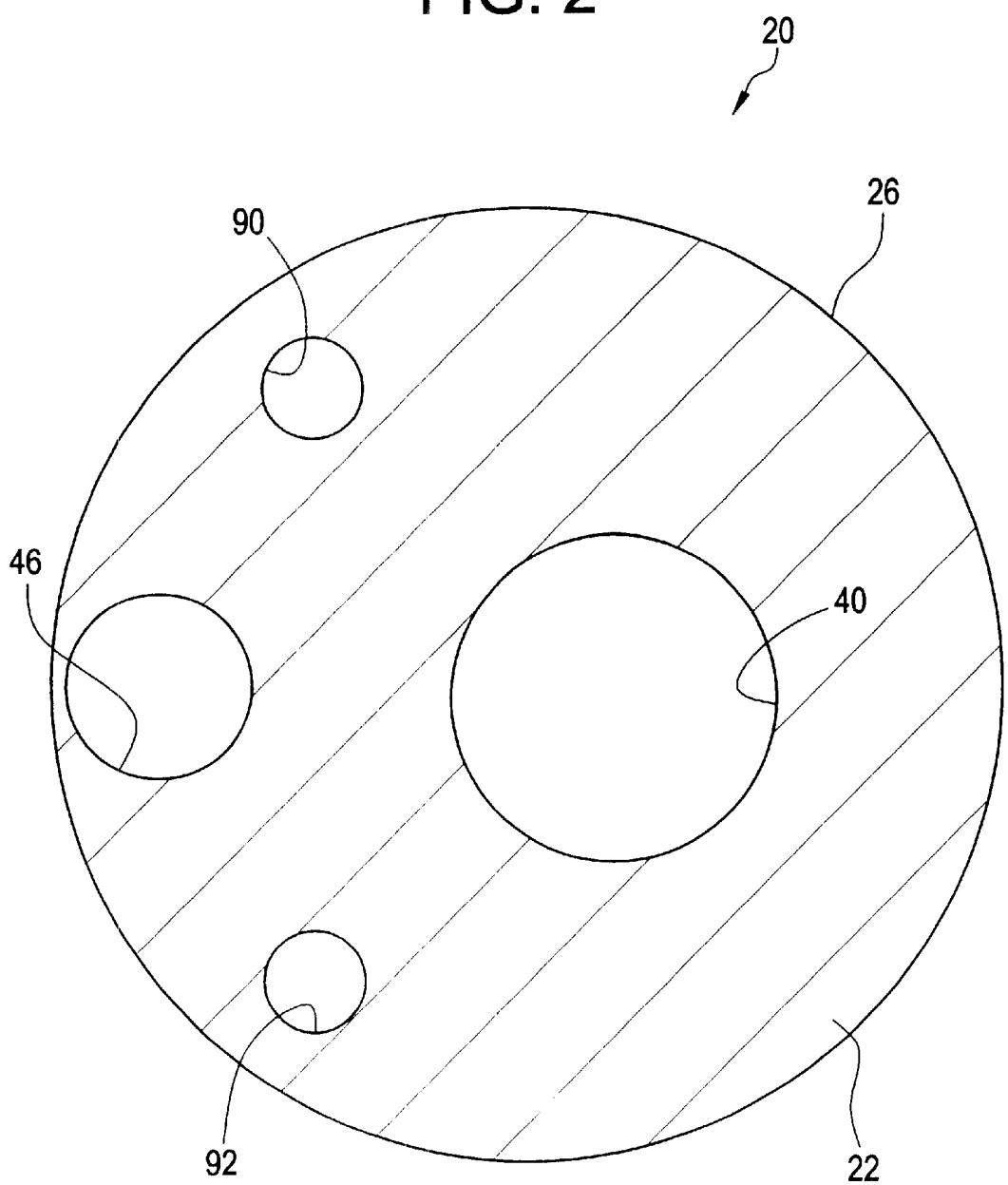
FIG. 2 is a horizontal cross-sectional view of the pre-combustion chamber of FIG. 1 taken along the line II—II.

An annular chamber 88 is formed between the inner housing 22 and the outer housing 70, sealed at its ends by the seals 80 and 86. As shown in FIG. 2, the second end portion 26 of the inner housing 22 is formed with a cooling medium inlet port 90 and a cooling medium outlet port 92. During operation of the engine, a cooling fluid, typically water, is circulated through the chamber 88 via the inlet and outlet ports 90, 92.

In use, the pre-combustion chamber assembly 20 is used to replace a conventional spark plug in the spark plug well 4 of an internal combustion engine. Its method of operation as an ignition source for the combustible fuel mixture in the combustion chamber 8 of the engine is as for the pre-combustion chamber assemblies of the prior art and is known to the skilled person.

Periodically, after operation of the engine and the pre-combustion chamber assembly 20, the assembly 20 is removed from the spark plug well 4. The retaining ring 76 is removed, allowing the outer housing 70 to slide over the first end portion 24 of the inner housing 22 and be removed. Access may then be obtained to clean the outer surface of the inner housing 22. This cleaning is necessary in order to ensure sufficient transfer of heat from the inner housing 22 to the cooling medium during operation. With a regular program of maintenance, including removal of the outer housing 70 and cleaning of the outer surface of the inner housing 22, the operating lifetime of the entire pre-combustion assembly can be significantly increased.

Figure 3:
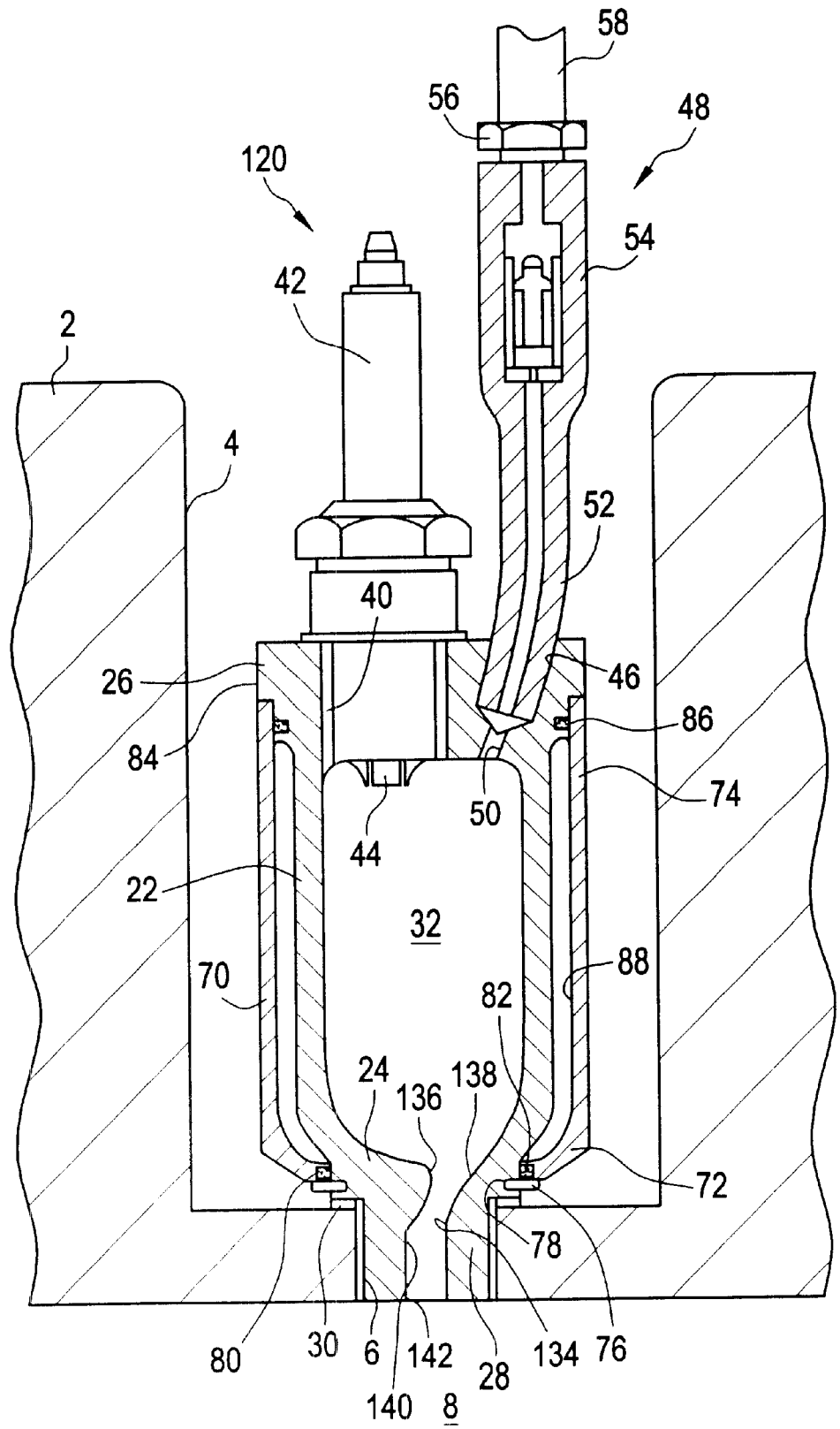
FIG. 3 is a longitudinal cross-sectional view of a pre-combustion chamber according to a second embodiment of the present invention.

Referring now to FIG. 3, a second embodiment of the pre-combustion chamber assembly of the present invention is shown, generally indicated as 120. The features of the embodiment of FIG. 3 common to those of the assembly of FIG. 1 are identified using the same reference numerals. The pre-combustion chamber shown in FIG. 3 comprises a modified port 134 connecting the pre-combustion chamber 32 with the combustion chamber 8 of the engine. The modified port comprises a first opening 136 into the pre-combustion chamber 32. The first opening 136 is offset from the central longitudinal axis of the pre-combustion chamber 32. A first port portion 138 extends at an angle to the central longitudinal axis of the pre-combustion chamber 32 from the first opening 136 towards the combustion chamber 8. The first port portion 138 communicates with a second port portion 140 extend along the central longitudinal axis of the pre-combustion chamber 32 to a second opening 142. The second opening 142 opens into the combustion chamber 8 with the pre-combustion chamber assembly 120 in place in the cylinder head 2 of the engine. In operation, the modified port 134, by virtue of the first opening 136 being offset as shown, causes the ignited gases leaving the pre-combustion chamber 32 to swirl. This swirl improves ignition and overall combustion of the charge of fuel mixture in the combustion chamber 8 of the engine, in turn leading to improved engine performance and greater fuel economy.

As shown in FIG. 3, the second opening 142 of the modified port 134 is coincident with the central longitudinal axis of the pre-combustion chamber 32. If desired, the second opening 142 may also be offset, in an alternative position to the offset first opening 136. In such a situation, the offset of the first opening 136 is preferably greater than that of the second opening 142.

While the preferred embodiments of the present invention have been shown in the accompanying figures and described above, it is not intended that these be taken to limit the scope of the present invention and modifications thereof can be made by one skilled in the art without departing from the spirit of the present invention.

What is claimed is:

1. A pre-combustion chamber assembly for an internal combustion engine, the pre-combustion chamber assembly comprising:
   an inner housing defining a pre-combustion chamber, the housing having a receiver for receiving a spark plug and an inlet for a fuel;
   a connector for securing the pre-combustion chamber in a spark plug well of the internal combustion engine, the connector comprising a port for connecting the pre-combustion chamber with a combustion chamber of the internal combustion engine;
   an outer housing having a first end and a second end and extending around the inner housing; and
   a chamber defined between the inner and outer housings; wherein
   the outer housing being releasably retained around the inner housing by a retainer, the retainer acting against the first end of the outer housing so as to allow relative movement between portions of the inner and outer housings while maintaining the integrity of the chamber, wherein the retainer is a retaining ring seated in a groove in the inner housing at the first end of the outer housing.

2. The pre-combustion chamber assembly of claim 1, wherein the outer housing is allowed to move both axially and circumferentially with respect to the inner housing.

3. The pre-combustion chamber assembly of claim 1, wherein the outer housing is releasably retained to the inner housing at its first end, the inner housing being free to move with respect to the outer housing at the second end of the outer housing.

4. The pre-combustion chamber assembly of claim 1, wherein the inner housing is free to move with respect to the outer housing at both the first end and the second end of the outer housing.

5. The pre-combustion chamber assembly of claim 1, wherein a seal is disposed between the first end of the outer housing and the inner housing.

6. The pre-combustion chamber assembly of claim 1, wherein the second end of the outer housing is retained by a retainer.

7. The pre-combustion chamber assembly of claim 6, wherein the retainer is a shoulder on the outer housing against which the second end of the outer housing abuts.

8. The pre-combustion chamber assembly of claim 6, wherein a seal is disposed between the second end of the outer housing and the inner housing.

9. A pre-combustion chamber assembly, for an internal combustion engine, the pre-combustion chamber assembly comprising:
   an inner housing defining a pre-combustion chamber, the housing having a receiver for receiving a spark plug and an inlet for a fuel;
   a connector for securing the pre-combustion chamber in a spark plug well of the internal combustion engine, the connector comprising a port for connecting the pre-combustion chamber with a combustion chamber of the internal combustion engine;
   an outer housing having a first end and a second end and extending around the inner housing; and
   a chamber defined between the inner and outer housings; wherein
   the outer housing being releasably retained around the inner housing so as to allow relative movement between portions of the inner and outer housings while maintaining the integrity of the chamber wherein the outer housing is retained at its first end by a retaining ring seated in a groove in the inner housing and at its second end by a shoulder on the inner housing.

10. The pre-combustion chamber assembly of claim 9, wherein a first seal is disposed between the first end of the outer housing and the inner housing and a second seal is disposed between the second end of the outer housing and the inner housing.

11. The pre-combustion chamber assembly of claim 9, further comprising an inlet for cooling medium to enter the chamber and an outlet for cooling medium to leave the chamber.

12. The pre-combustion chamber assembly of claim 9, further comprising a fuel supply assembly connected to the fuel inlet.

13. The pre-combustion chamber assembly of claim 12, wherein the fuel supply assembly comprises a fuel check valve.

14. A pre-combustion chamber assembly for an internal combustion engine, the pre-combustion chamber assembly comprising:
   an inner housing defining a pre-combustion chamber, the housing having a receiver for receiving a spark plug and an inlet for a fuel;
   a connector for securing the pre-combustion chamber in a spark plug well of the internal combustion engine, the connector comprising a port for connecting the pre-combustion chamber with a combustion chamber of the internal combustion engine, wherein the connector has a first end and a second end;
   the port having a first opening in the first end of the connector within the pre-combustion chamber and a second opening in the second end of the connector, the first opening being offset from the central longitudinal axis of the pre-combustion chamber;
   an outer housing having a first end and a second end and extending around the inner housing; and
   a chamber defined between the inner and outer housings; wherein the outer housing being releasably retained around the inner housing so as to allow relative movement between portions of the inner and outer housings while maintaining the integrity of the chamber.

15. The pre-combustion chamber assembly of claim 14, wherein the second opening is offset from the first opening and the central longitudinal axis of the pre-combustion chamber.

16. The pre-combustion chamber assembly of claim 14, wherein the port between the precombustion chamber and the combustion chamber comprises a first portion extending substantially parallel with the central longitudinal axis of the pre-combustion chamber and a second portion extending at an angle to the central longitudinal axis of the pre-combustion chamber.

17. An internal combustion engine comprising at least one cylinder having a combustion chamber, the engine further comprising at least one cylinder head assembly, the cylinder head assembly comprising a spark plug well and a threaded bore extending into the combustion chamber, the engine further comprising a pre-combustion chamber assembly in the spark plug well, the pre-combustion chamber assembly comprising:

an inner housing defining a pre-combustion chamber, the housing having a receiver for receiving a spark plug and an inlet for fuel;

a connector threaded into the threaded bore for securing the pre-combustion chamber in the spark plug well, the connector comprising a port for connecting the pre-combustion chamber with the combustion chamber;

an outer housing having a first end and a second end and extending around the inner housing; and a chamber defined between the inner and outer housings; wherein the outer housing being releasably retained around the inner housing by a retainer, the retainer acting against the first end of the outer housing so as to allow relative movement between portions of the inner and outer housings while maintaining the integrity of the chamber, wherein the retainer is a retaining ring seated in a groove in the inner housing at the first end of the outer housing.

18. A method of modifying an internal combustion engine, the method comprising securing in a spark plug well of the engine a pre-combustion chamber assembly, the pre-combustion chamber assembly comprising:

an inner housing defining a pre-combustion chamber, the housing having a receiver for receiving a spark plug and an inlet for fuel;

a connector for securing the pre-combustion chamber in the spark plug well of the internal combustion engine, the connector comprising a port for connecting the pre-combustion chamber with a combustion chamber of the internal combustion engine;

an outer housing having a first end and a second end and extending around the inner housing; and a chamber defined between the inner and outer housings; wherein the outer housing being releasably retained around the inner housing by a retainer, the retainer acting against the first end of the outer housing so as to allow relative movement between portions of the inner and outer housings while maintaining the integrity of the chamber, wherein the retainer is a retaining ring seated in a groove in the inner housing at the first end of the outer housing.

19. An internal combustion engine comprising at least one cylinder having a combustion chamber, the engine further comprising at least one cylinder head assembly, the cylinder head assembly comprising a spark plug well and a threaded bore extending into the combustion chamber, the engine further comprising a pre-combustion chamber assembly in the spark plug well, the pre-combustion chamber assembly comprising:

an inner housing defining a pre-combustion chamber, the housing having a receiver for receiving a spark plug and an inlet for fuel;

a connector threaded into the threaded bore for securing the pre-combustion chamber in the spark plug well, the connector comprising a port for connecting the pre-combustion chamber with the combustion chamber;

an outer housing having a first end and a second end and extending around the inner housing; and a chamber defined between the inner and outer housings; wherein the outer housing being releasably retained around the inner housing by a retainer, the retainer acting against the first end of the outer housing so as to allow relative movement between portions of the inner and outer housings while maintaining the integrity of the chamber, wherein the retainer is a retaining ring seated in a groove in the inner housing at the first end of the outer housing.

20. An internal combustion engine comprising at least one cylinder having a combustion chamber, the engine further comprising at least one cylinder head assembly, the cylinder head assembly comprising a spark plug well and a threaded bore extending into the combustion chamber, the engine further comprising a pre-combustion chamber assembly in the spark plug well, the pre-combustion chamber assembly comprising:

an inner housing defining a pre-combustion chamber, the housing having a receiver for receiving a spark plug and an inlet for fuel;

a connector threaded into the threaded bore for securing the pre-combustion chamber in the spark plug well, the connector comprising a port for connecting the pre-combustion chamber with the combustion chamber;

an outer housing having a first end and a second end and extending around the inner housing;

a chamber defined between the inner and outer housings;

the outer housing being releasably retained around the inner housing so as to allow relative movement between portions of the inner and outer housings while maintaining the integrity of the chamber; and, the connector has a first end and a second end and the port having a first opening in the first end of the connector within the pre-combustion chamber and a second opening in the second end of the connector, the first opening being offset from the central longitudinal axis of the pre-combustion chamber.

21. A method of modifying an internal combustion engine, the method comprising securing in a spark plug well of the engine a pre-combustion chamber assembly, the pre-combustion chamber assembly comprising:

an inner housing defining a pre-combustion chamber, the housing having a receiver for receiving a spark plug and an inlet for fuel;

a connector for securing the pre-combustion chamber in the spark plug well of the internal combustion engine, the connector comprising a port for connecting the pre-combustion chamber with a combustion chamber of the internal combustion engine;

an outer housing having a first end and a second end and extending around the inner housing;

a chamber defined between the inner and outer housings; wherein the outer housing being releasably retained around the inner housing so as to allow relative movement between portions of the inner and outer housings while maintaining the integrity of the chamber; and, wherein the outer housing is retained at its first end by a retaining ring seated in a groove in the inner housing and at its second end by a shoulder on the inner housing.

22. A method of modifying an internal combustion engine, the method comprising securing in a spark plug well of the engine a pre-combustion chamber assembly, the pre-combustion chamber assembly comprising:

an inner housing defining a pre-combustion chamber, the housing having a receiver for receiving a spark plug and an inlet for fuel;

a connector for securing the pre-combustion chamber in a spark plug well of the internal combustion engine, the connector comprising a port for connecting the pre-combustion chamber with a combustion chamber of the internal combustion engine, wherein the connector has a first end and a second end;

the port having a first opening in the first end of the connector within the pre-combustion chamber and a second opening in the second end of the connector, the first opening being offset from the central longitudinal axis of the pre-combustion chamber;

an outer housing having a first end and a second end and extending around the inner housing; and a chamber defined between the inner and outer housings; wherein the outer housing being releasably retained around the inner housing so as to allow relative movement between portions of the inner and outer housings while maintaining the integrity of the chamber.

* * * * *